(12) United States Patent
Sekiya et al.

(10) Patent No.: US 6,546,738 B2
(45) Date of Patent: Apr. 15, 2003

(54) STIRLING REFRIGERATOR

(75) Inventors: Hiroshi Sekiya, Ota (JP); Takahiro Nakamura, Ota (JP); Itsuo Nakazaki, Ota (JP); Takashi Inoue, Oizumi-machi (JP); Ryousuke Tuihiji, Gunma-Ken (JP); Takeo Komatsubara, Kiryu (JP); Hiroshi Kanai, Ota (JP); Kazuya Sato, Oizumi-machi (JP); Takayuki Mizuno, Ashikaga (JP); Eiji Fukuda, Oizumi-machi (JP); Yasuo Sakamoto, Oizumi-machi (JP); Hiroshi Nishikawa, Tatebaya (JP); Denji Mashimo, Oizumi-machi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/064,453

(22) Filed: Jul. 17, 2002

(65) Prior Publication Data
US 2003/0019217 A1 Jan. 30, 2003

(30) Foreign Application Priority Data

| Jul. 24, 2001 | (JP) | 2001-223585 |
| Jul. 24, 2001 | (JP) | 2001-223586 |
| Jul. 24, 2001 | (JP) | 2001-223587 |
| Jul. 24, 2001 | (JP) | 2001-223588 |
| Jul. 24, 2001 | (JP) | 2001-223589 |
| Jul. 24, 2001 | (JP) | 2001-223590 |

(51) Int. Cl.[7] ............... F25B 9/00; F01B 29/10; F16J 15/50
(52) U.S. Cl. ................. 62/6; 60/520; 74/18
(58) Field of Search ................ 62/6; 60/520; 74/18; 277/504; 285/299

(56) References Cited

U.S. PATENT DOCUMENTS

| 4,620,418 A | * | 11/1986 | Fujiwara et al. ............... 60/517 |
| 5,046,929 A | * | 9/1991 | Novotny et al. ............ 417/439 |
| 5,662,335 A | * | 9/1997 | Larsen ...................... 277/636 |
| 6,279,325 B1 | * | 8/2001 | Sekiya et al. .................... 62/6 |

FOREIGN PATENT DOCUMENTS

| JP | 9-11706 A | * | 9/1997 |
| JP | 9-112704 A | * | 9/1997 |

* cited by examiner

Primary Examiner—William C. Doerrler
(74) Attorney, Agent, or Firm—Jiang Chyun IP Group

(57) ABSTRACT

A Stirling refrigerator, which prevents oil rising, makes oil seal bellows have long-life, and includes a housing, cylinder, piston, piston rod and an oil seal bellows. The oil seal bellows seals a space between the housing and the cylinder, wherein a tip end of the oil seal bellows is sealed and fixed on the piston or on the piston rod inside the cylinder, and a base end of the oil seal bellows is installed on the housing. The oil seal bellows reciprocates with a stroke, wherein the tip end of the oil seal bellows is compressed to a compression side from a position of free length then returns to the position of free length.

19 Claims, 11 Drawing Sheets

STIRLING REFRIGERATOR

CROSS REFERENCE TO RELATED APPLICATIONS

This application claims the priority benefit of Japanese application serial no. 2001-223585 filed on Jul. 24, 2001, 2001-223586 filed on Jul. 24, 2001, 2001-223587 filed on Jul. 24, 2001, 2001-223588 filed on Jul. 24, 2001, 2001-223589 filed on Jul. 24, 2001 and 2001-223590, filed on Jul. 24, 2001.

BACKGROUND OF INVENTION

1. Field of the Invention

This invention relates to a Stirling refrigerator.

2. Description of Related Art

In recent years, a Stirling refrigerator has been suggested as a refrigerating device using a substitute for environmentally problematic Freon, or as a refrigerator whose operation temperature is in a broader range than that of a conventional cooling device. This refrigerator can be applied to the apparatuses utilizing cooling heat for business or household use as a freezer, a refrigerator, and a throw-in type cooler, and the cooling heat utilizing apparatuses of all industrial fields such as a low-temperature fluid circulator, a low-temperature isothermal unit, an isothermal tank, a heat shock test device, a freezing drier, a thermal property test device, a blood/cell storage-devices, a cold cooler, and other various cooling heat devices. Furthermore, this refrigerator is compact, high in coefficient of performance, and excellent in energy efficiency.

In a heat engine of the Stirling refrigerator, working gas is sealed into a housing of the machine in a sealed condition, wherein the housing forms the body of the machine, and has a crank chamber and a motor chamber. The working gas flows through a flow passage between a compression chamber (high-temperature chamber) and an expansion chamber (low-temperature chamber). A radiating heat exchanger (at high-temperature side), a regenerator and a cooling heat exchange (at low-temperature side) are disposed along the flow passage of the working gas. A cooling heat refrigerant and a radiating refrigerant are respectively heat-exchanged by the radiating and cooling heat exchangers, and a heat exchanging performance is enhanced by radiating and absorbing of heat.

The working gas is expended or compressed by expansion or compression piston through driving devices such as connecting rods that are disposed on a crank shaft driven by a motor. A shock-resistant balancer is disposed on the crank shaft.

A coupler for injecting the working gas is set in a crank chamber and a buffer chamber (a back space of the piston inside the compression or the expansion cylinder) of a Stirling refrigerator such as Stirling heat engine. The coupler can link the source of the working gas in order to inject the working gas.

A pressure sensor, which also functions as a pressure adjuster, is detachably installed on an installing block through a pressure sensor fitment (referring to the prior art example in FIG. 7B).

The Stirling refrigerator has a problem, which is so-called oil rising, that oil or oil mist rises from a crank chamber along the piston rods. Regarding the oil rising, as the oil or oil mist enters the cylinders, the oil or oil mist adheres to the inner surfaces of the cylinder effecting the sealing performance of the piston rings. Not only the durability and the reliability of the refrigerator are obviously decreased, but also the compressed gas and oil enter the compression gas utilizing apparatuses, so that the compression gas utilizing apparatuses or parts treated by compression gas utilizing apparatuses is deteriorated.

For solving the oil rising problem, the conventional piston rod is sealed by an oil ring seal. The oil ring seals are generally made of gum and have been developed using various structures and materials, but they are not necessarily sufficient in sealing performance or durability.

Therefore, inventors have proposed an oil seal bellows (referring to Japanese Patent application 10-365371) as a rod seal (piston rod seal) of a Stirling refrigerator. In the invention of 10-365371, an oil seal metal bellows is set between a housing of the Stirling refrigerator and the compression and expansion cylinders, preventing the oil rising from entering the compression cylinder and the expansion cylinder from the crank chamber along the surface of the piston rods.

The balancer installed on the crank shaft is generally fixed by screws onto an installing surface formed on the crank shaft (a flat surface mostly). However, the balancer moves (rotates) centered on the screws with respect to the crank shaft during operation and therefore the installing portion drifts, so that the shock-resistant performance is reduced.

Although the coupler for injecting working gas is separated from the Stirling refrigerator, it is still affected by the vibration due to the operation of the Stirling refrigerator, so that the fixing screws of the coupler loosen and thus the working gas leaks.

In the Stirling refrigerator, the oil seals are used to seal the cylinders (compression, and expansion cylinders) in order to prevent the oil from entering the cylinder along the piston rod from the crank chamber during operation. However, as the pressure difference of working gas between the crank chamber and cylinders is created, problems of oil seals being imperfect or broken occur.

It is needed to regularly check the working gas pressure in the crank chamber to inject the working gas through the coupler, to adjust flare nuts attached to the pressure sensor, or to adjust the working gas pressure. However, because the flare nuts are buried inside the pressure sensor fitment and are not easy to approach (referring to prior art in FIG. 7B), it is not easy to adjust working gas during the maintenance, such as the regular check of the fix etc.

Inventors developed the above oil seal bellows installed in the Stirling refrigerator to further increase the life time of the oil seal bellows. However, this has become not preferable due to fatigue generated when they repeat moving back and forth in a predetermined stroke in a compression and a expansion directions.

The regenerator is generally formed by filling with tiny wire-netting material. The inferior quality of the wire-netting material, which turns bad when time goes by, will be cut into pieces and flow with working gas into the heat exchangers, high-temperature chamber, low-temperature chamber, etc., so that the flowing resistance of working gas increases and the smooth activity of the piston is frustrated, causing the performance to be deteriorated and damaged.

The space of the cylinders forming the high-temperature chamber or the low-temperature chamber and the space between housings are sealed by the rod seals, such as the oil seal bellows, so that the oil doesn't flow from the crank chamber of the housing into the space of the cylinders. However, if a pressure difference of working gas exists between the space of cylinders and inside of the housing, it burdens the rod seal, makes the performance decrease and causes breaking. The pressure in the space of the cylinders is not stable, the performance of the heat engine is therefore not stable.

Because the housing is generally formed by casting and the working gas filled into the housing has a small molecular weight, such as helium or the like, it should be noted that the gas leaks from the thin part of the casting.

Especially, when some accessories, such as terminal box are fixed to the thin part of the housing by screws, the thickness is relatively thin in the region of screw hole so that the working gas leaks form the relatively thin part to the outside. The working gas pressure inside the housing therefore decreases, and the performance, the durability of the rod seal and performance of heat engine worsens.

SUMMARY OF INVENTION

According to the foregoing description, an object of this invention is to provide a Stirling refrigerator preventing the installing position moving with respect to the crank shaft, and the balancer can be fixed onto the crank shaft without moving in order to improve the shock-resistant function.

Another object of the prevent invention is to provide a balancer, which prevents looseness of the fixing screws of the coupler, in order to prevent the working gas leak.

Still another object of the prevent invention is to provide a pressure sensor installing fitment and an installing structure such that the working gas in the crank chamber can be easily adjusted without taking off some special part such as a flare nut for adjusting pressure in the pressure sensor.

Still another object of the prevent invention is to provide an oil seal bellows to prevent the oil rising with higher sealing performance and longer life in order to improve the performance, reliability and durability of the machine.

Still another object of the prevent invention is to provide a Stirling refrigerator even if the wire-netting material is cut into pieces, they don't flow with working gas from the regenerator, so the trouble caused by the cut pieces can be prevented, the performance of the machine can be kept from deteriorating, and the device damage can be prevented.

Still another object of the present invention is to provide a fixing structure to solve the problem of sealing working gas into a Stirling heat engine by fixing a fitting onto the thin part of the housing with screws, so the working gas leak from the thin part in the screw hole region can be prevented.

According to the objects mentioned above, there is provided a Stirling refrigerator, comprising: a housing formed by casting, wherein a motor and a crank are disposed inside the housing, and a working gas is sealed inside the housing, a part of the housing has a thin portion, and a fitting is installed on the thin portion, and the fitting is fixed on the thin portion by a tapping screw; a cylinder fixed on a top of the housing; a piston, reciprocating inside the cylinder; a piston rod moving with the crank, wherein one end of the piston rod links the piston and passes through the housing; and an oil seal bellows sealing a space between the housing and the cylinder, wherein a tip end of the oil seal bellows is sealed and fixed on the piston or the piston rod inside the cylinder, and a base end of the oil seal bellows is installed on the housing, and the oil seal bellows reciprocating with a stroke, wherein the tip end of the oil seal bellows is compressed to a compression side from a position of free length then returns to the position of free length.

Additionally, the oil seal bellows is applied in the compression cylinder and in the expansion cylinder or one of them.

Moreover, the fitting is a terminal box.

Furthermore, the working gas is helium, hydrogen or argon.

Furthermore, there is provided a Stirling refrigerator, further comprising an balancer installing structure, wherein the crank having a crank shaft driven by the motor, and the balancer installing structure is fixed on the crank shaft by a screw, and on each surface of the crank shaft and the balancer, which contacts with each other, has a small hole acentric from the screw, and a position determining pin is used to insert in the small hole in order to prevent the balancer from moving onto an installing face of the crank shaft.

Additionally, each amount of the small holes formed on each of the surfaces and the position determining pin is one or two or more.

Moreover, the position determining pin is a split pin.

Furthermore, there is provided a Stirling refrigerator, further comprising a working gas injecting coupler installing structure in order to connect to a working gas supply pipe coming from a working gas source and to inject the working gas into the Stirling refrigerator, and the working gas injecting coupler installing structure comprising: a fixing screw, fixing and connecting the coupler and the working gas supply pipe; a coupler installing fitment; and a coupler shock-resistant fitment fixed on the coupler installing fitment with the coupler.

Additionally, the coupler shock-resistant fitment is fixed on the coupler installing fitment, and the coupler shock-resistant fitment contacts with the fixing screws in a way that the fixing screws won't be loosened.

Moreover, the Stirling refrigerator further comprising a crank chamber or a buffer chamber, wherein the coupler for injecting the working gas injects the working gas into the crank chamber or the buffer chamber.

Furthermore, the shock-resistant fitment has a door-shaped flange.

Additionally, the shock-resistant fitment is a pair of members, wherein each of the members is L-shaped sectional.

Furthermore, there is provided a Stirling refrigerator further comprising a crank chamber, a installing block and a pressure sensor installing structure, wherein the installing block has a through hole connecting the crank chamber, and a pipe for supplying the working gas connects the through hole of the installing block, and a pressure sensor, which is pressure-adjustable, is installed on the installing block through fixing a pressure sensor installing fitment having a slit, and a pressure of the pressure sensor is adjusted by inserting an adjusting instrument from the slit.

Additionally, the pressure sensor installing fitment is C-shaped planar.

Furthermore, there is provided a Stirling refrigerator further comprising a high-temperature chamber and a radiating heat exchanger, a low-temperature chamber and a cooling heat exchanger, a working gas flow passage and a regenerator, wherein the working gas flow passage is between the high-temperature chamber and the low-temperature, and the regenerator is disposed between the radiating heat exchanger and the cooling heat exchanger, and an exit and an entrance of the working gas are formed respectively at two ends of the regenerator, and filters are respectively disposed on the exit and the entrance.

Additionally, the regenerator is made of tiny wire-netting material.

Moreover, the filters are made of porous sinter material or ceramic.

BRIEF DESCRIPTION OF DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DETAILED DESCRIPTION

Figure 1:
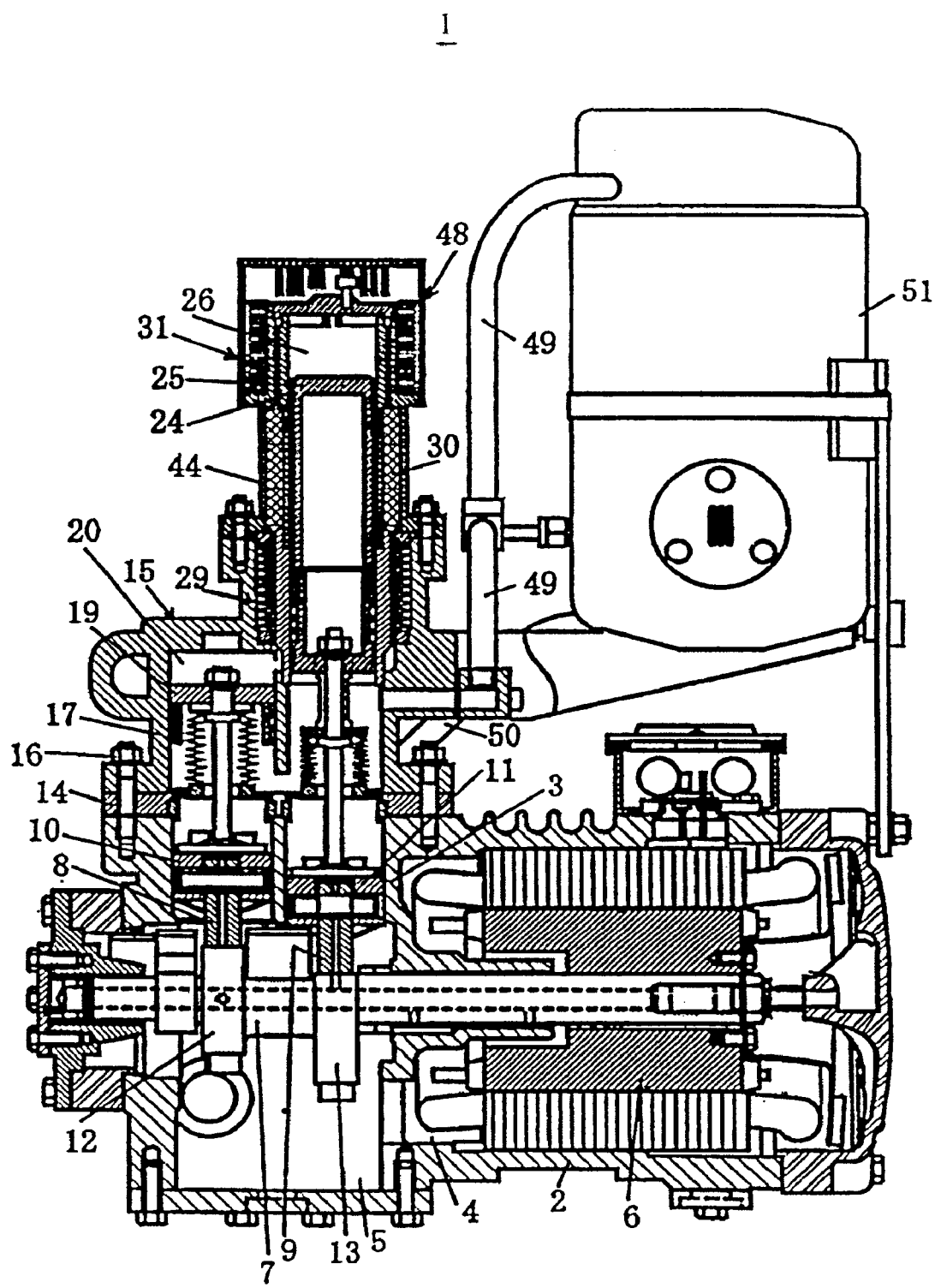
FIG. 1 is a front view showing the entire Stirling refrigerator according to the present invention.
Figure 2:
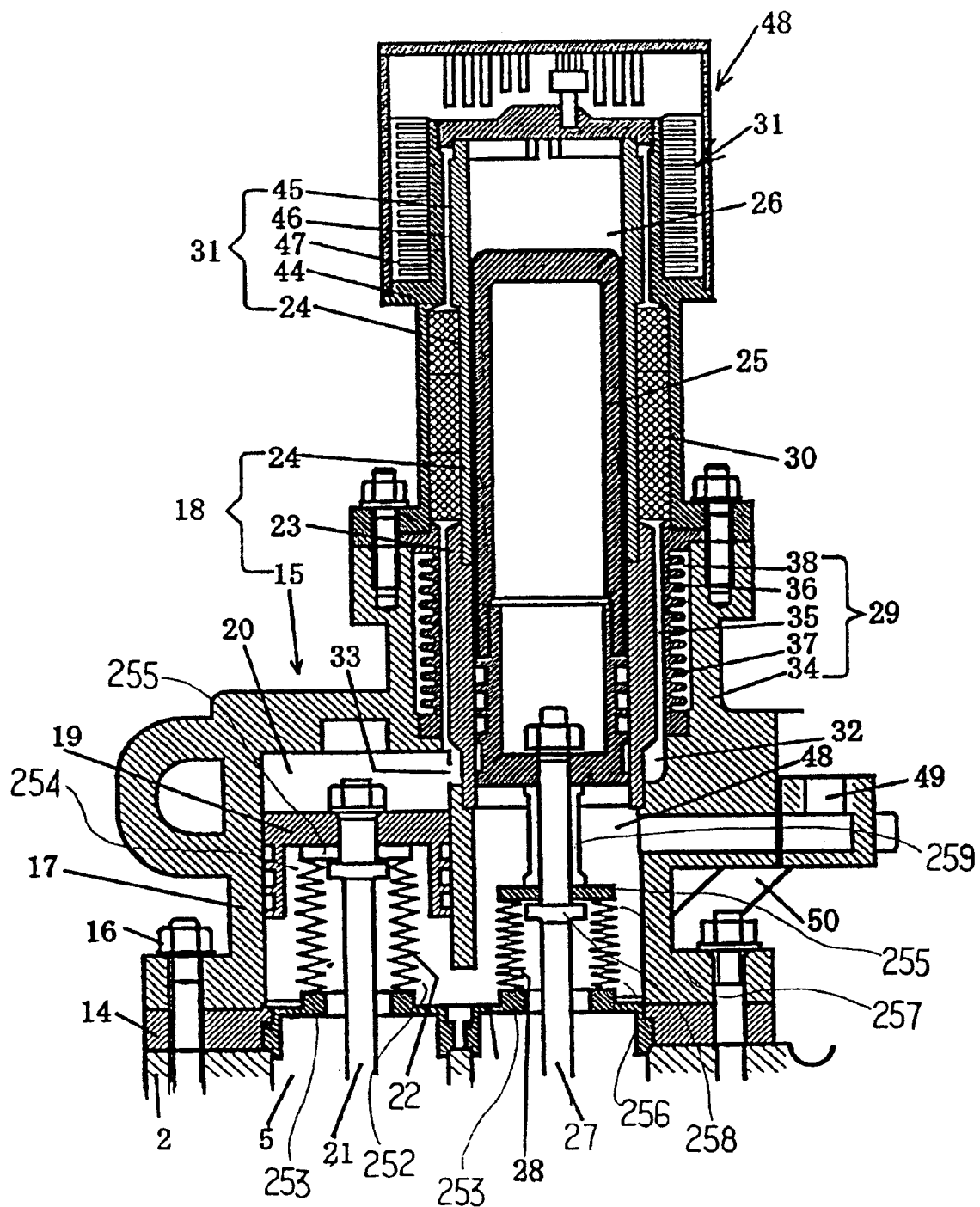
FIG. 2 is a partial view of FIG. 1.
Figure 3:
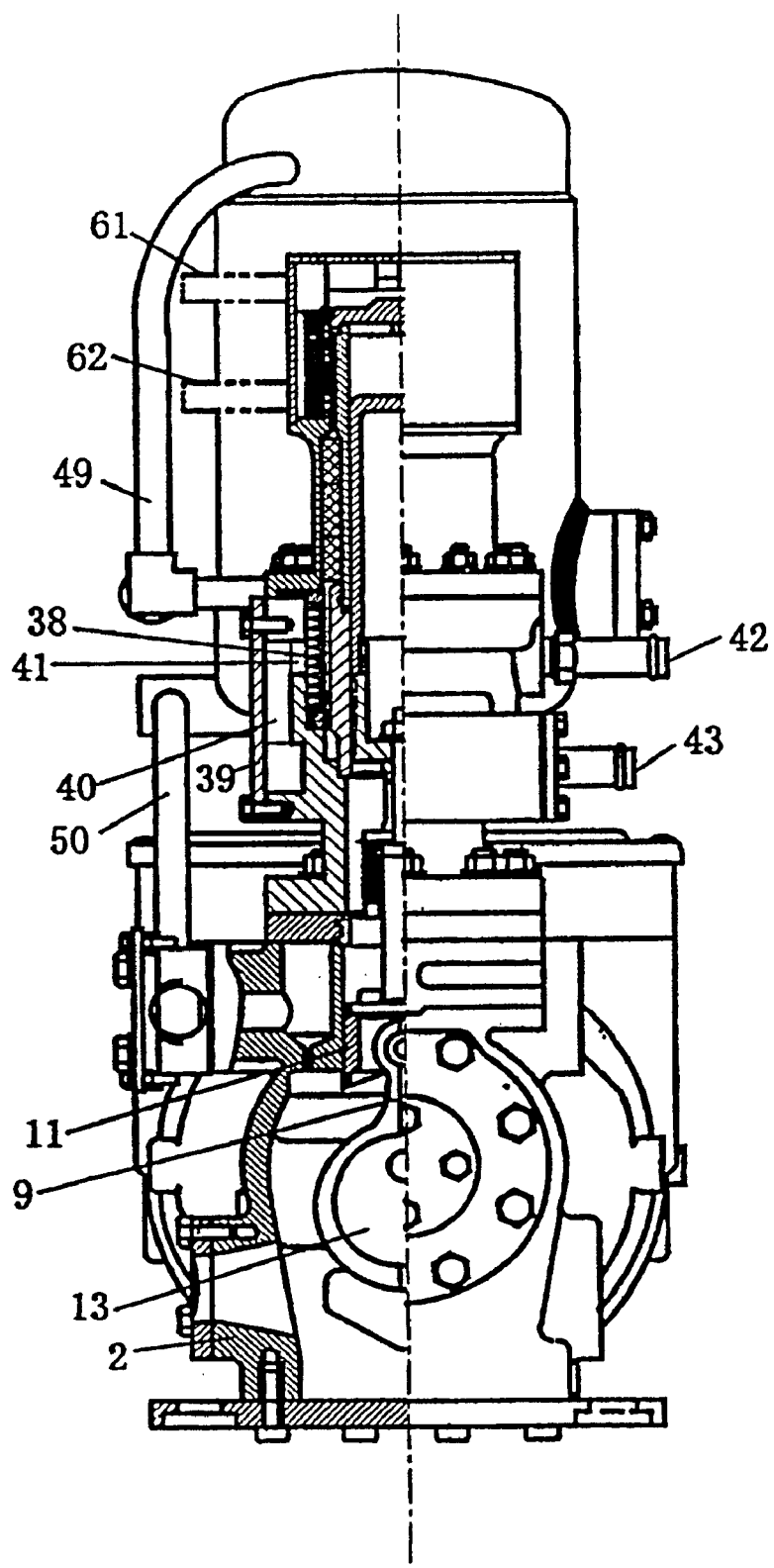
FIG. 3 is a partial cross-sectional right view of FIG. 1.

Preferred embodiments according to the present invention will be described with reference to the accompanying drawings. FIG. 1 to FIG. 3 shows the Stirling refrigerator suitable for the present invention. FIG. 1 is a front view showing the entire Stirling refrigerator. FIG. 2 is a partial view of FIG. 1. FIG. 3 is a partial cross-sectional view showing the right side of FIG. 1.

The housing 2, which forms the body of the Stirling refrigerator 1, is formed by casting, and the inside thereof is kept close in order to seal the gas. The housing 2 is partitioned into a motor chamber 4 and a crank chamber 5, both of which are connected through a compartment wall 3. A forward/reverse rotatable motor 6 is disposed in the motor chamber 4. A crank shaft 7, connecting rods 8, 9 and cross guide heads 10, 11, which serve as a driving mechanism, are arranged in the crank chamber 5.

Two crank portions 12, 13 of the crank shaft 7 are formed with a phase shift therebetween so that the crank portion 13 moves prior to the movement of the crank portion 12 when the motor 3 is forwardly rotated. The phase shift is generally set to about 90 degrees. The connecting rods 8, 9 are installed on the crank portions 12, 13. The cross guide heads 10, 11 are installed on the connecting rods 8, 9.

A cylinder block 15 is installed with a bolt 16 at an upper portion of the crank chamber 5 inside the housing 2 via a base 14 so that the cylinder block 15 forms a compression cylinder 17 and forms a portion (lower portion) of an expansion cylinder 18.

A compression piston 19 reciprocates in the compression cylinder 17. A high-temperature chamber 20 is formed in an upper space (compression space) on the compression piston 19 in the compression cylinder 17. In the high-temperature chamber 20, a working gas is compressed to have a high temperature. A compression piston rod 21 links the compression piston 19 and the cross guide head 10, and extends from the crank chamber 5 to the compression cylinder 17. An oil seal bellows 22 is disposed between the compression piston rod 21 and an upper portion of the housing 2 in order to seal the space between the compression cylinder 17 and the crank chamber 5 and to prevent the oil rising from the crank chamber 5.

On the other hand, a lower portion of a expansion cylinder 18 is formed by the cylinder block 15 described above and an upper portion of the expansion cylinder 18 is formed by an inner cylinder 23 of a radiating heat exchanger 29 and an inner tube 24 of a cooling heat exchanger. An expansion piston 25 reciprocates in the expansion cylinder 18. A low-temperature chamber 26 is formed in an upper space (expansion space) of the expansion piston 25 in the expansion cylinder 18. In the low-temperature chamber 26, the working gas is expended to have a low temperature.

An expansion piston rod 27 links the expansion piston 25 and cross guide head 11, and extends from the crank chamber 5 to the expansion cylinder 18. An oil seal bellows 28 is disposed between the expansion piston rod 27 and an upper portion of the housing 2 in order to seal the space between the expansion cylinder 18 and the crank chamber 5 and to prevent the oil rising from the crank chamber 5. The expansion piston 25 moves prior to the compression piston 19 only by the phase of 90 degrees.

The radiating heat exchanger 29 (high-temperature side heat exchanger), the regenerator 30 and the cooling heat exchanger 31 (low-temperature side heat exchanger) are linked to form a loop to surround the expansion cylinder 18. A manifold 32 (flow passage of the working gas) is formed at a lower end of the radiating heat exchanger 29 and on the periphery of the expansion cylinder 18.

A connecting hole 33 is formed at an upper end of the compression cylinder 17 to communicate with the high-temperature chamber 20 and the manifold 32. The high-temperature chamber and 20 low-temperature chambers 26 are configured so that the connecting hole 33, the manifold 32, the radiating heat exchanger 29, the regenerator 30 and the cooling heat exchanger 31 are connected in sequence.

A radiating heat exchanger housing 34 is disposed at an upper portion of the cylinder block 15. A heat exchanger tube 37 is imbedded between the radiating heat exchanger housing 34 and the inner cylinder 23 to form the radiating heat exchanger (high-temperature side heat exchanger) 29. Slender grooves 35, which form the working gas flow passage, are formed at an inner surface of the heat exchanger tube 37, and radiating fins 36 are formed outside of the heat exchanger tube 37.

The working gas flows through the slender grooves 35, and a cooling water flows in a radiating passage 38 between the radiating heat exchanging housing 34 and radiating fins 36. In this way, the heat of the working gas is radiated into the cooling water. A lid plate 39 is waterjointed on left and right sides of the cylinder block 15, and a cooling water passage 40 is formed between the lid plate 39 and the cylinder block 15. The cooling water passage 40 connects the radiating passage 38 through the inlet 41 and surrounds the compression cylinder 17 and expansion cylinder 18.

A flow-in port 42 for the cooling water is set in the radiating passage 38, and a flow-out port 43 is set in the cooling water passage 40. The flow-in port 42 and flow-out port 43 are connected to an air-cooling radiator with cooling fins through cooling water circulating pipes and cooling water circulating pumps, which are not shown in a diagram.

The inner cylinder 23 is imbedded into a lower portion of the inner tube 24 to form a portion of the expansion cylinder 18. A cooling heat exchanger housing 44, which is on an upper periphery of the inner tube 24, is detachably fixed on the cylinder block 15. The cooling heat exchanger housing 44 has a plurality of slender grooves 45 that are formed on the inner surface and are imbedded into an inner tube 24 to form the working gas flow passage 46 and has cooling fins 47 outside. With this structure, the cooling heat exchanger (low-temperature side heat exchanger) 31 is formed.

The cooling heat exchanger 31 chills a cooling heat refrigerate of a cooling heat utilizing apparatus that uses the cooling heat of the Stirling refrigerator according to the present invention. Air, water, alcohol, HFE, PFC can be used as the cooling heat refrigerate.

The regenerator 30 made of cold-cumulating material such as metal mesh is disposed at the annular space between the inner tube 24 and the cooling heat exchanger housing 44.

The space between the oil seal bellows 28 and the expansion piston 25 (the same as the space between the oil seal bellows 22 and the compression piston 19) is a buffer space (buffer chamber) 48. The buffer space 48 is connected to a buffer tank 51 through a pipe 49 and a connecting block 63. The buffer tank 51 is connected by a pipe 50 to the crank chamber 5 (motor chamber 4 is also fine) in the housing 2.

Figure 6A:
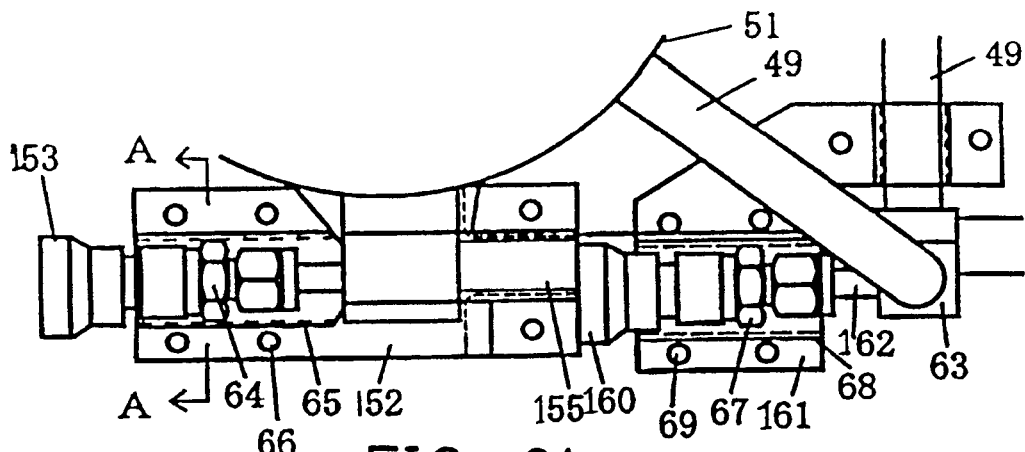
FIG. 6A is a plan view showing the coupler for supplying working gas in the Stirling refrigerator 1.
Figure 6B:
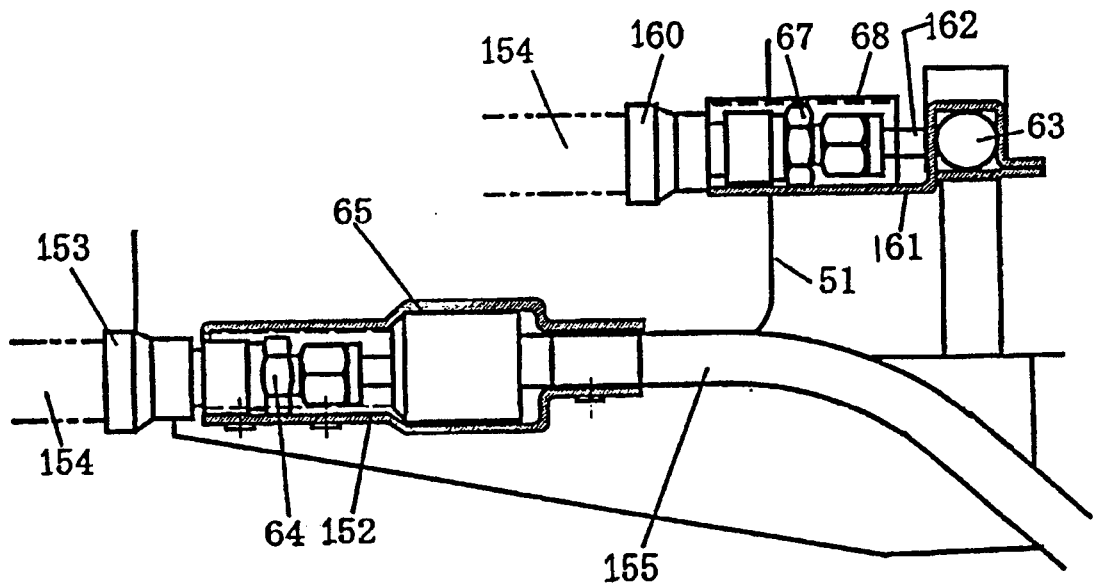
FIG. 6B is a cross-sectional view of FIG. 6A.
Figure 6C:
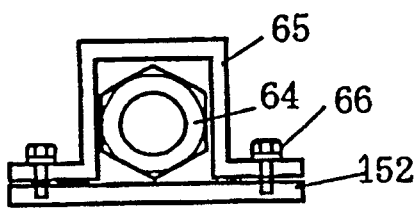
FIG. 6C is a cross-sectional along the line A—A of FIG. 6B.

A coupler 153 is fixed on a coupler installing fitment 152 as shown in FIG. 6C, a shock-resistant fitment 65 with door-sectional-flange embays the coupler 153 from left, right, top and bottom, and contacts with fixing nuts 64 of the coupler 153, and the shock-resistant fitment 65 is installed on the coupler installing fitment 152 by bolts 66.

Figure 4A:
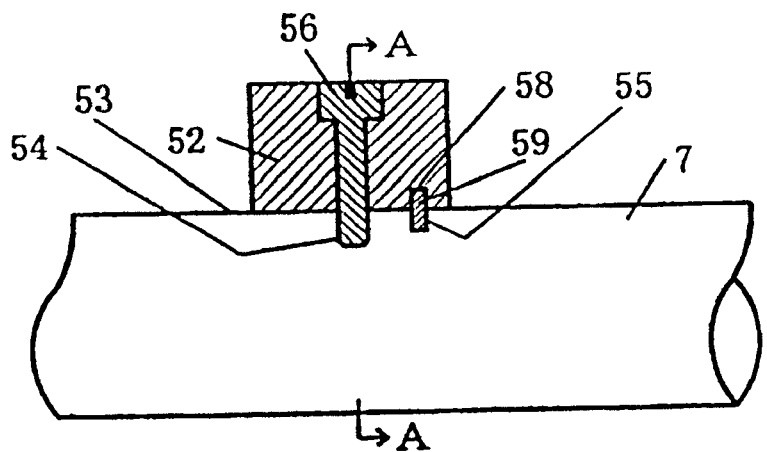
FIG. 4A is a cross-sectional view showing the installing of the balancer 52 according to the present invention.
Figure 4B:
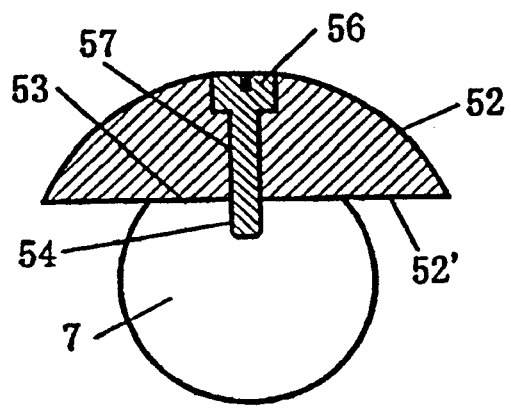
FIG. 4B is a cross-sectional along the line A—A of FIG. 4A.
Figure 4C:
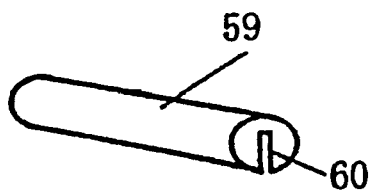
FIG. 4C is a perspective view showing a position determining pin.
Figure 4D:
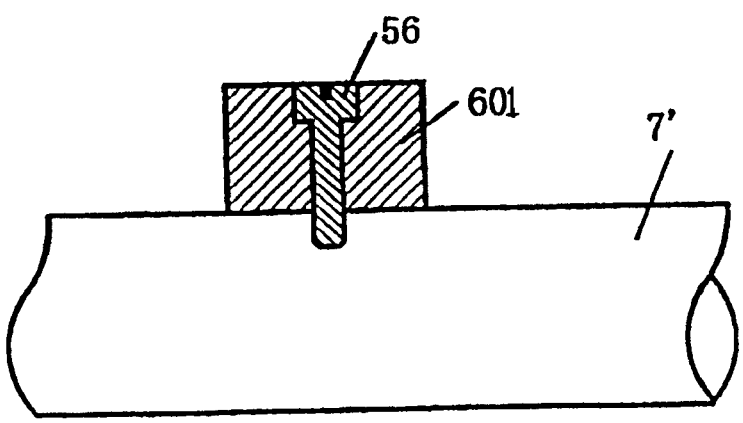
FIG. 4D is a diagram showing an installing structure of a conventional balancer.

The Stirling refrigerator with the structure described above has the features as follows. The installing structure of the balancer 52 installed on the crank shaft 7 of the Stirling refrigerator 1 (see FIG. 1) is shown in FIG. 4A and FIG. 4B. FIG. 4A is a cross-sectional view showing the installation of the balancer 52 according to the present invention. FIG. 4B is a cross-sectional view along the line A—A of FIG. 4A. FIG. 4C is a perspective view showing a position determining pin. FIG. 4D is a diagram showing an installing structure of a conventional balancer.

A portion of the upper surface of the crank shaft 7 is used to form a flat installing surface 53. As shown in FIG. 4B, the balancer 52 is installed in contact with the flat installing surface 53. A screw hole 54 (female screw) is formed on the flat installing face 53, and a small hole 55 is formed at a place acentric from the screw hole 54. On the other hand, a through hole 57 for inserting through a screw 56 is formed on the balancer 52, and a small hole 58 with the same diameter as that of the small hole 55 is formed at a place acentric from the screw 56 on a bottom 52" of the balancer 52.

Most important, the small holes 55, 58 are formed respectively on the flat installing face 53 and on the bottom 52" of the crank shaft 7 at places acentric from the screw hole 54 and screw 56, wherein the installing face 53 and the bottom 52" are in contact with each other.

When installing the balancer 52 onto the crank shaft 7, first, the position determining pin 59 shown in FIG. 4C is inserted into the small hole 55 of the flat installing face 53 or the small hole 58 of the balancer 52. A split pin with slit 60 can be used as the position determining pin 59. After inserting the position determining pin 59 into the small hole 58 of the balancer 52 or the small hole 55 of the flat installing face 53, the balancer 52 is mounted onto the flat installing face 53. Then, the screw 56 is inserted to the through hole 57 of the balancer to be screwed into the screw hole 54 of the crank shaft 7. In this way, the balancer 52 is fixed to the crank shaft 7.

Figure 5:
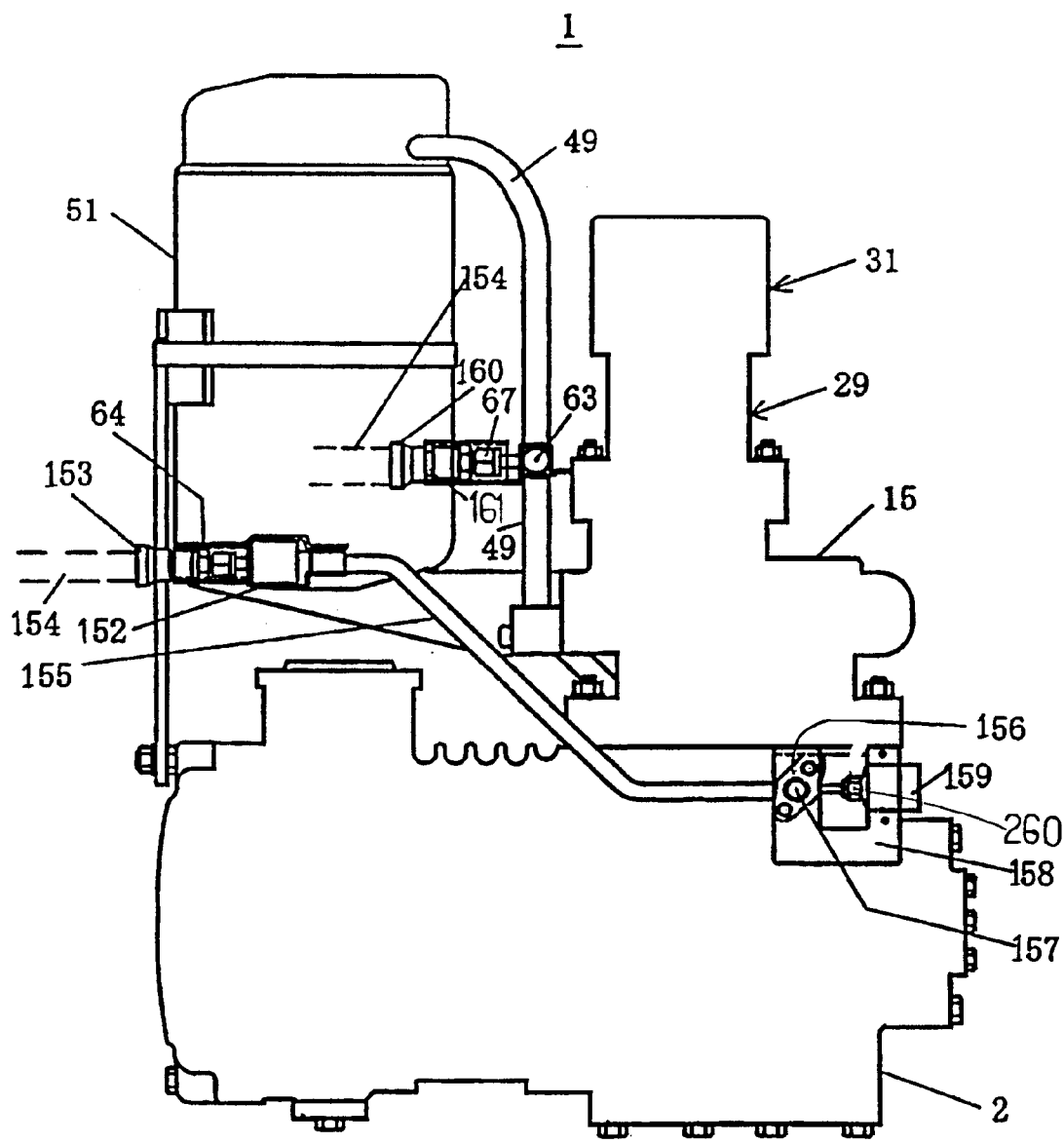
FIG. 5 is a back view showing the entire Stirling refrigerator.

The Stirling refrigerator with the structure described above has further features as follows. FIG. 5 is a back view showing the Stirling refrigerator 1 of FIG. 1, especially an entire profile is shown. FIG. 6A is a plan view showing the coupler for supplying working gas in the Stirling refrigerator 1. FIG. 6B is a cross-sectional view of FIG. 6A. FIG. 6C is a cross-sectional view along the line A—A of FIG. 6B.

The coupler 153 is installed at a lower portion of the buffer tank 51 through the coupler installing fitment 152 in order to inject the working gas into the crank chamber 5. When supplying the working gas, the working gas supply pipe 154, which connects to the outer working gas source, is detachably connected to the coupler 153 by fixing nuts 64 (fixing screws for instance in this embodiment).

One end of a connecting pipe 155 is connected to the coupler 153; the other end of the connecting pipe 155 is connected to the installing block 156. The installing block has a through hole 157 that connects to the crank chamber 5 via a through hole (not shown) of the housing 2. The connecting pipe 155 is connected to the housing 2 via the through hole 157 of the installing block 156. A pressure sensor installing fitment 158 is fixed on the installing block 156, and a pressure sensor 159 is installed by the pressure sensor installing fitment 158.

A coupler 160 is disposed above the coupler 153 with a coupler installing fitment 161 in order to inject the working gas into the buffer chamber 48. The coupler 160 is connected to the connecting block 63 through a connecting pipe 162, and is further connected to the buffer chamber 48 of the Stirling refrigerator 1 through the pipe 49. The connecting block 63 is connected to the buffer tank 51 through the pipe 49.

Similar to the coupler 153, when working gas is supplied to the buffer chamber 48, the working gas supply pipe 154 that is connected to the outer working gas source is detachably connected to the coupler 160 by fixing nuts 67 (fixing screws for instance in this embodiment).

Like the coupler 153, the coupler 160 is fixed on the coupler installing fitment 161, and a shock-resistant fitment 68 with door-sectional-flange embays the coupler 160 from left, right, top and bottom, and contacts with fixing nuts 67 of the coupler 160, and the shock-resistant fitment 68 is installed on the coupler installing fitment 161 by bolts 69.

Figure 7A:
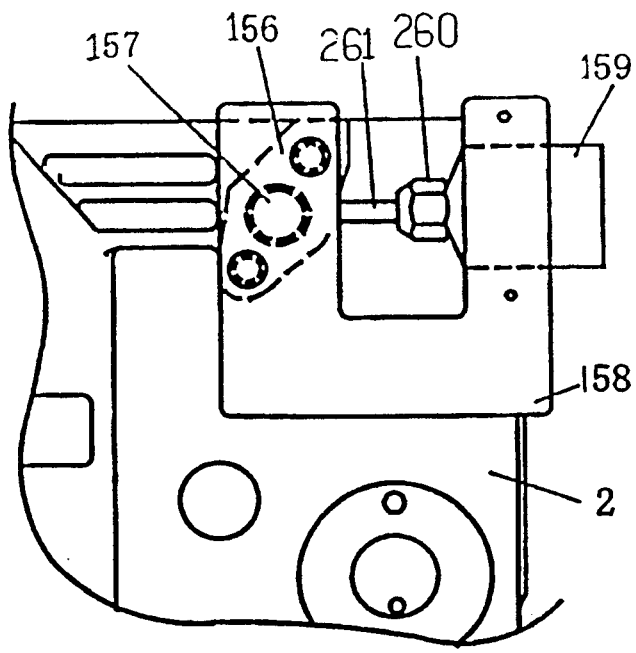
FIG. 7A is a diagram showing the structure of the pressure sensor installing fitment according to the present invention.
Figure 7B:
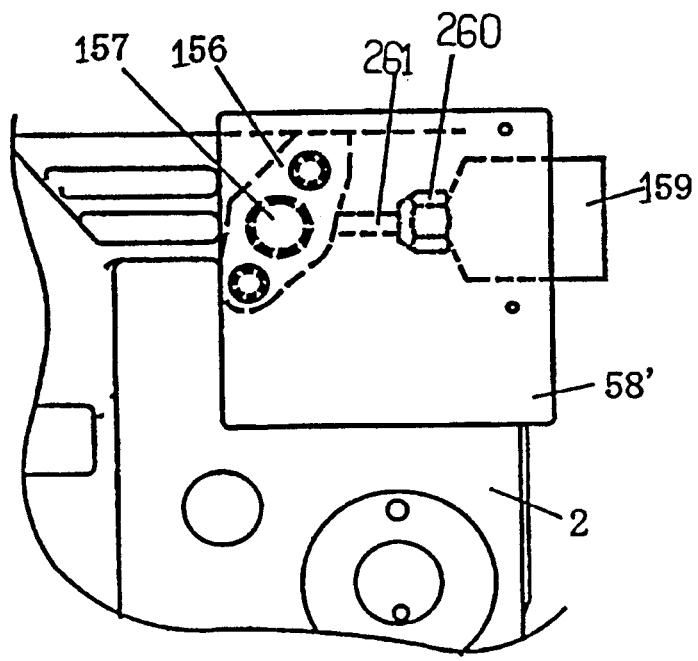
FIG. 7B is a diagram showing the structure of the conventional pressure sensor installing fitment.

The Stirling refrigerator with the structure described above has further features as follows. The pressure sensor installing fitment 158 is fixed on the installing block 156, and the pressure sensor 159 is installed through the pressure sensor installing fitment 158. FIG. 7A is a diagram showing the structure of the pressure sensor installing fitment according to the present invention. FIG. 7B is a diagram showing the structure of the conventional pressure sensor installing fitment 58'.

As shown in FIG. 7A, the pressure sensor 159 capable of adjusting the pressure is installed by bolts 260 in a way that connects to the through hole 157 of the installing block 156 via a connecting pipe 261. The pressure sensor 159 can release the working gas to adjust the pressure of the working gas in the crank chamber 5.

The conventional pressure sensor installing fitment 58' is formed with a rectangular shape, as shown in FIG. 7B. Because bolts 260 are disposed between the pressure sensor installing fitment 58' and the housing 2, after installing the pressure sensor fitment 58', the bolts 260 cannot be adjusted.

To solve this problem, the pressure sensor installing fitment 158 according to the present invention is designed to be a plane C shape as shown in FIG. 7A. Therefore, some adjusting instruments, such as the spanner, can be inserted into the gap of the C-shaped pressure sensor installing fitment 158, so that the pressure can be easily adjusted.

Figure 8A:
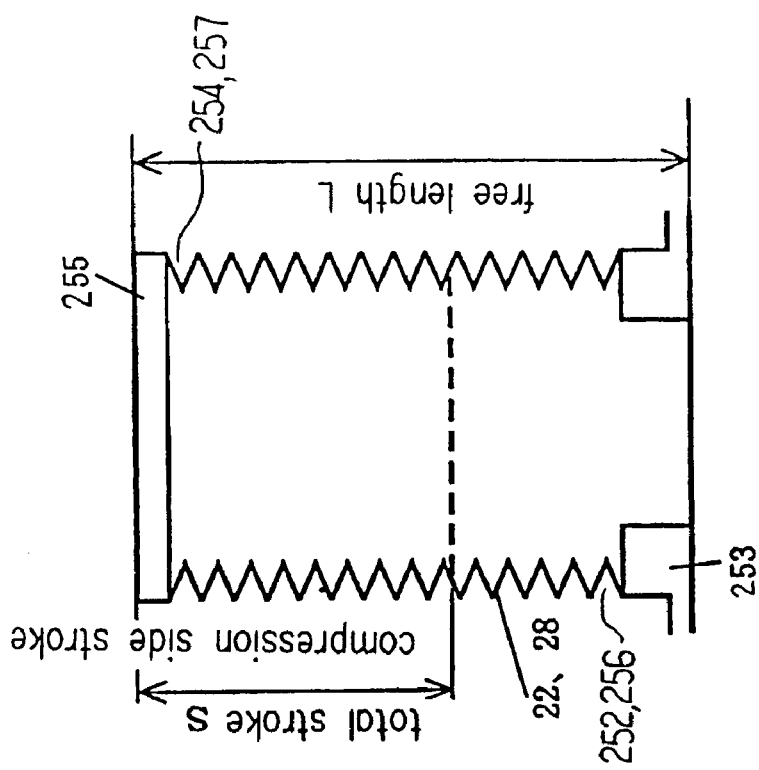
FIG. 8A is a diagram showing the oil seal bellows according to the present invention.
Figure 8B:
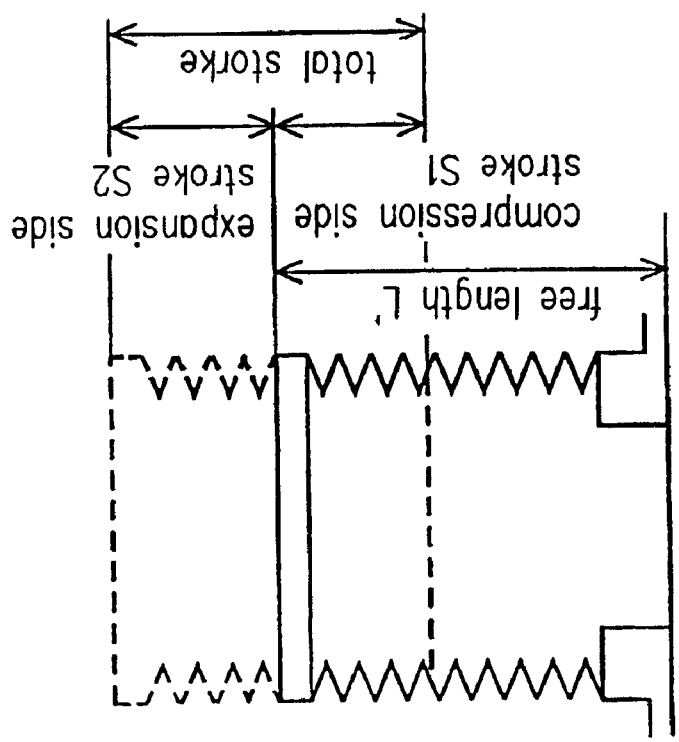
FIG. 8B is a diagram showing the conventional oil seal bellows.

The Stirling refrigerator with the structure described above has further features as follows. The installed oil seal bellows 22, 28 in the compression side and the expansion side as shown in FIG. 2 are used in the Stirling refrigerator according to the present invention. FIG. 8A is a diagram showing the oil seal bellows according to the present invention. FIG. 8B is a diagram showing the conventional oil seal bellows.

The material of the oil seal bellows used in the invention can be a metal bellows made of welding SUS, or a resin bellows integrately formed by resin.

As shown in FIG. 2, a lower end 252 of the oil seal bellows 22 at the compression side is welded to the oil seal bellows fixing plate 253 (fixing plate), and an upper end 254 is welded to the oil seal bellows installing plate 255 (installing plate). The fixing plate 253 is fixed on the housing 2 through the base 14. The installing plate 255 is fixed on the expansion piston 19 by nuts.

Additionally, as shown in FIG. 2, similar to the oil seal bellows 22 at the compression side, a lower end 256 of the oil seal bellows 28 at the expansion side is welded to the fixing plate 253, and an upper end 257 is welded to the installing plate 255. The fixing plate 253 is fixed on the housing 2 through the base 14. The installing plate 255 is fixed on a big diameter portion 258 of the expansion piston rod 27 by nuts through a sleeve 259.

The oil seal bellows 22, 28 at the compression side and expansion side reciprocate respectively within strokes according to reciprocative stroke of the compression and expansion piston 19, 18. Diameters, free lengths and strokes of the compression side and expansion side bellows 22, 28 are not limited to the same. FIG. 8A is a diagram showing a reciprocation and a stroke with free length L, stroke S. For ease of understanding, the free length L and the stroke S includes thicknesses of the fixing plate 253 and installing plate 255.

FIG. 8B is a diagram of prior art. The total reciprocating stroke S in prior art is the same as that in the present invention, but free length L' of the oil seal bellows in prior art is shorter than the free length L in the present invention. The prior art moves stroke S1 to the compression side and moves stroke S2 to the extension side from the position of free length L' in order to reciprocate total stroke S only.

The inventors of the present invention repeated the reciprocation of the oil seal bellows while studying the Stirling refrigerator. They found that, comparing the reciprocations with same total strokes, the oil seal bellows in FIG. 8B with repeating compressing stroke S1 and extending stroke S2 from the position of the free length makes much more fatigue than the oil seal bellows in FIG. 8A with repeating compressing stroke S and returning to free length. This is because the force for generating fatigue when repeating compressing and extending strokes is much bigger than when repeating only compressing.

According to this event found above, the oil seal bellows as shown in FIG. 8A with reciprocating total stroke S from the position of free length L to the compression side can be used as the oil seal bellows 22, 28 at the compression side and expansion side respectively in order to install them in the Stirling refrigerator 1 according to the present invention as shown in FIG. 2.

Figure 9A:
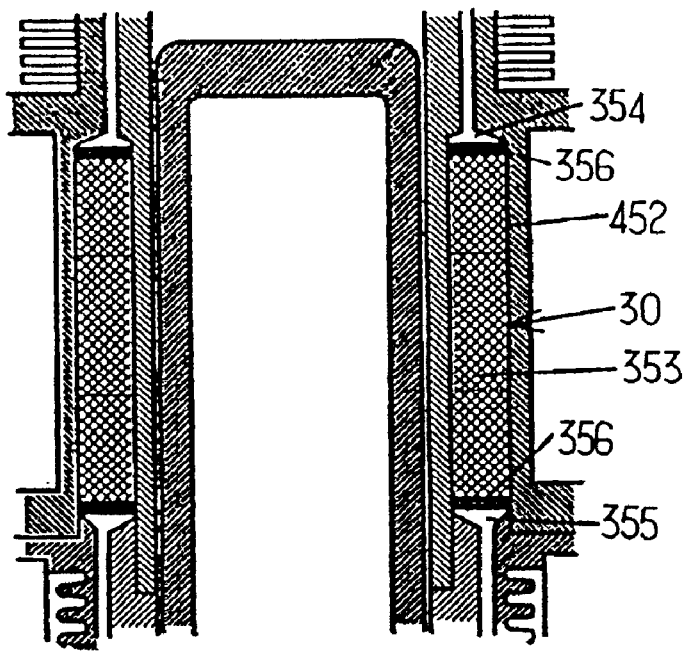
FIG. 9A is a diagram showing the regenerator according to the present invention.
Figure 9B:
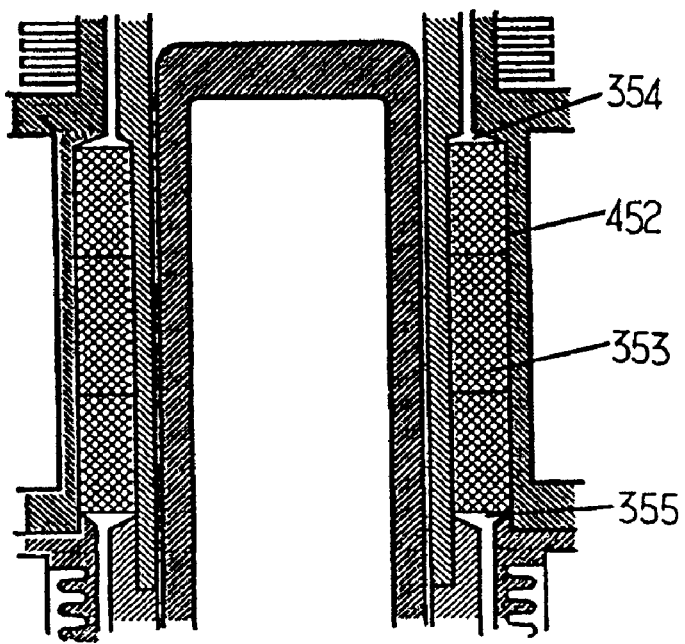
FIG. 9B is a diagram showing the conventional regenerator.

The Stirling refrigerator with the structure described above has further features as follows. In the Stirling refrigerator according to the present invention as shown in FIG. 2, the regenerator 30 is disposed between the radiating heat exchanger 29 and cooling heat exchanger 31. FIG. 9A is a diagram showing the regenerator 30 according to the present invention. FIG. 9B is a diagram showing the conventional regenerator.

As shown in FIG. 2 and FIG. 9, the regenerator 30 is formed by filling tiny wire-netting material 353 into an annular space 452 defined by the inner tube 24 of the cooling heat exchanger 31 and the cooling heat exchanger housing 44 outside of the inner tube 24. The tiny wire-netting material 353 is pressed into a fixed shape.

Inside the Stirling refrigerator, the working gas reciprocates between the high-temperature and low-temperature chambers 20, 26. When the working gas frequently passes through the regenerator 30, a part of the wire-netting material 353 will be cut into pieces as time goes by, and the cut pieces will flow through slender grooves 35, 45 into the high-temperature and low-temperature chambers 20, 26 with the working gas.

In the case where the problem described happens, the slender grooves 35, 45 get jammed, and the flowing resistance of the working gas rises, causing energy-loss. Further because the working gas and the cut pieces flow from high-temperature chamber 20 or low-temperature chamber 26 into the gap between the inner surfaces of the compression piston 19 or the expansion piston 25 and the compression cylinder 17 or expansion cylinder 18, the smooth reciprocating of the pistons is obstructed, and that causes cylinder damage.

Because the conventional regenerator as shown in FIG. 9B only fills tiny wire-netting material 353 into the annular space 452, it cannot prevent the cut pieces of the wire-netting material 353 from flowing with the working gas.

However, filters 356 are disposed at an upper exit/entrance 354 and lower exit/entrance 355 of the working gas flowing out and in at upper and lower ends of the annular space 452 of the regenerator 30 according to the present invention as shown in FIG. 9A.

Those filters 356 have gaps formed thereon, through which the working gas can pass, but the cut pieces of the wire-netting material 353 cannot pass. For example, a thin plate with tiny meshes made of SUS, or a thin plate with porous sinter material made of metal or ceramic can be used as the filter 356.

Figure 10A:
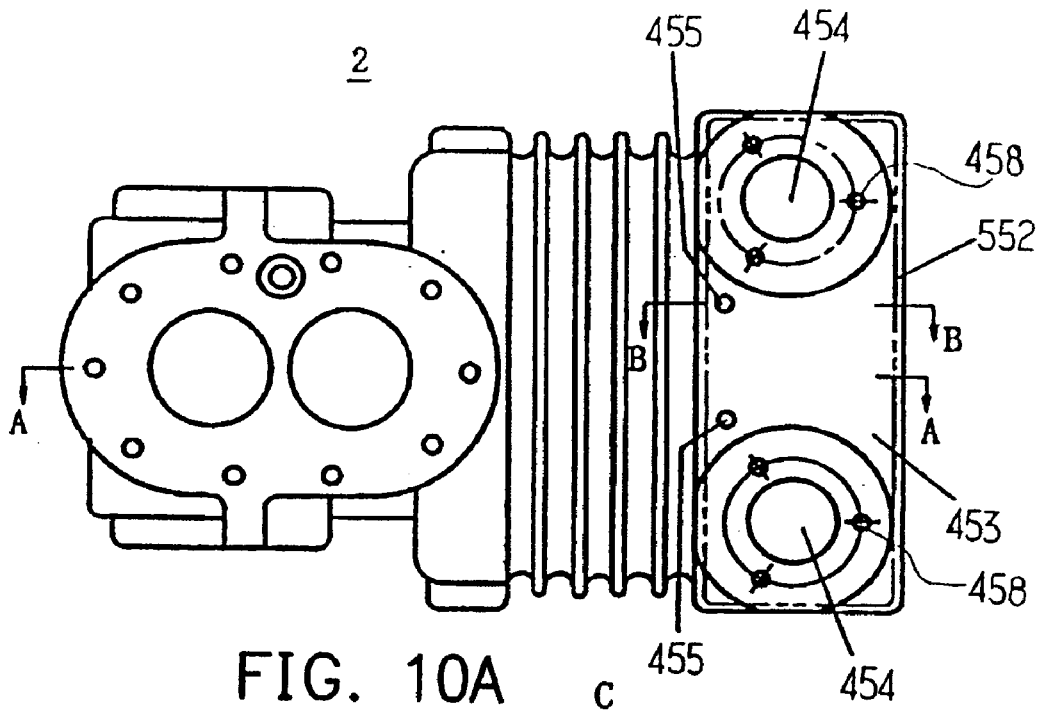
FIG. 10A is a plan view (top view) of a diagram showing the housing according to the present invention.
Figure 10B:
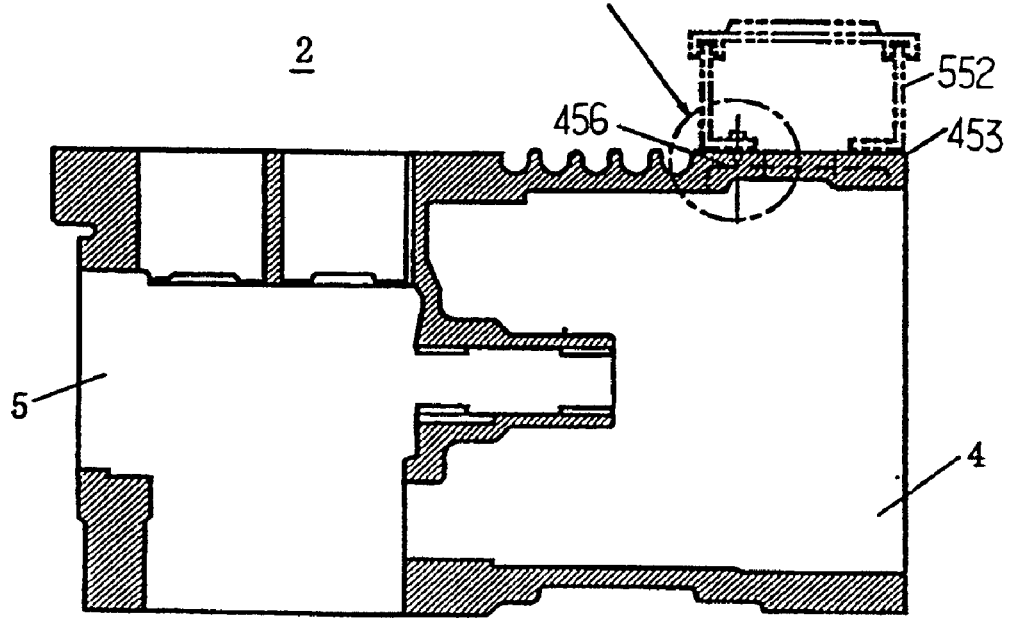
FIG. 10B is a cross-sectional view along the line A—A of FIG. 10A.

The Stirling refrigerator with the structure described above has further features as follows. As shown in FIGS. 10A and 10B, a fitting, terminal box 552 is installed on the motor chamber 4 inside the housing 2. The terminal box 552 forms a terminal portion of wires to accept power and transfer the electricity to motor 6. One of features according to the present invention focuses on a fixing structure of a fitting such as the terminal box 552.

FIG. 10A is a plan view (top view) of a diagram showing the housing 2 of the Stirling refrigerator 1. FIG. 10B is a sectional view of a diagram taken along a line A—A of FIG. 10A. A flat face 453 with a rectangular shape is formed above the right side of the housing 2, as shown in FIGS. 10A, 10B.

Through holes 454 for inserting wires to the motor chamber 4 are formed on the flat face 453. Then the terminal box 552 is installed in such a way that the terminal box 552 is loaded on the flat face 453 in the position shown as an imaginary line in FIG. 10A, and then tapping screws 458 are screwed into lower holes 455 of the tapping screw to install the terminal box 552 in the way shown as an imaginary line in FIG. 10B.

Figure 11A:
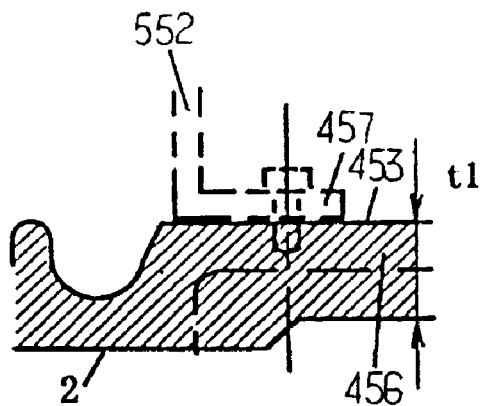
FIG. 11A is an enlargement view of a partial diagram of FIG. 10B.
Figure 11B:
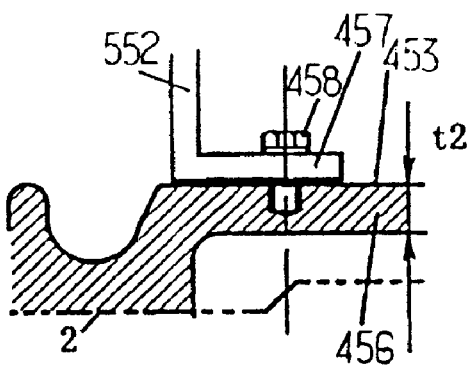
FIG. 11B is a cross-sectional view showing the thin portion according to the present invention.

A partial sectional view of a diagram taken along a line B—B of FIG. 10A is a sectional part of flat face 453 in FIG. 10B as shown in a dotted line. FIG. 11A is an enlarged view of a part C in FIG. 10B. FIG. 11B is a cross-sectional view showing a thin portion 456. The thickness t2 of the thin portion 456 near the lower hole 455 for the tapping screws in the flat face 453 of the housing 2 is thinner than any other thickness t1 formed in the flat face 453.

Figure 11C:
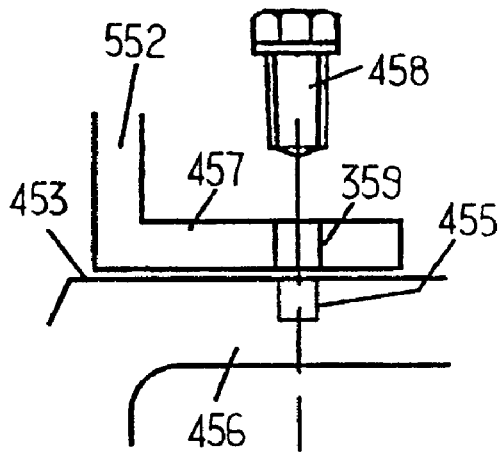
FIGS. 11C to 11D are steps showing fixing the terminal box onto the thin portion according to the present invention.
Figure 11D:
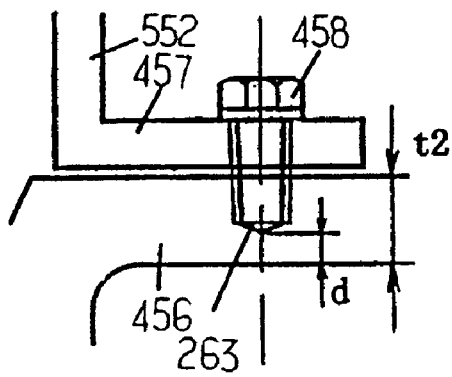

According to the present invention, as shown in FIGS. 11A, 11B, an installing flange 457 of the terminal box 552 is fixed on the thin portion 456 by tapping screws 458. Specifically speaking, as shown in FIG. 11C, the lower holes 455 for the tapping screws are formed first on the thin portion 456, and lower holes 359 for the tapping screws are formed on the installing flange 457. Then, the tapping screws 458 are tapped and screwed from the lower holes 359 to the lower holes 455 to fix the terminal box 552 as shown in FIG. 11D.

Figure 11E:
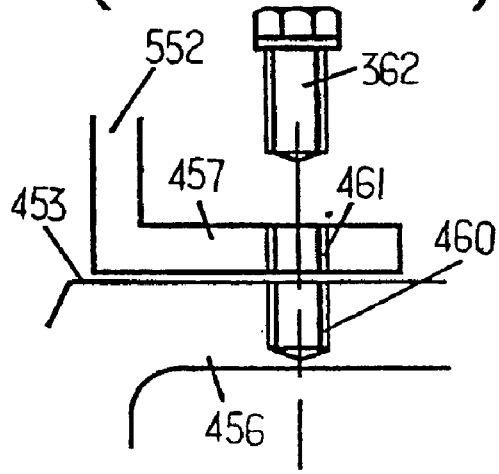
FIGS. 11E to 11F are steps showing fixing the terminal box onto the conventional thin portion.
Figure 11F:
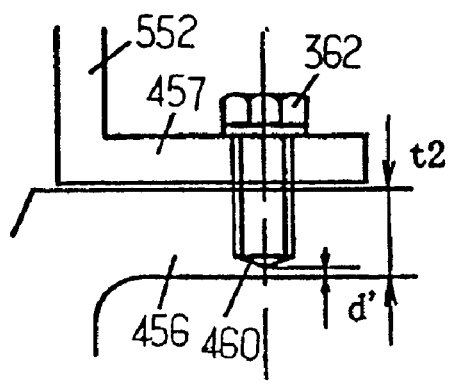

The conventional example shown in FIGS. 11E and 11F. Screw holes 460, 461 are formed on the thin portion 456 and installing flange 457, then bolts 362 are screwed into the screw holes 460, 461 in order to fix the terminal box 552 on the flat face 453. However, it is needed to cut the screw portion in screw holes, thus the screw holes 460 have to be deeply formed in the thin portion 456 (near a lower portion of the thin portion 456).

In this situation, as shown in FIG. 11F, the thickness d' between the bottom of screw holes 460 and the lower portion of the thin portion 456 becomes very small. If the thickness of the casting become thinner, it causes a problem that the working gas flows through the casting and leaks to outside of the housing 2, because the housing 2 is formed by casting, and the working gas with a small molecular weight such as helium is sealed into the housing 2.

On the contrary, the tapping screws 458 tape and screw from the lower holes 359 to the lower holes 455 for tapping screws at the same time. It is unnecessary to form deep screw holes in advance as in the prior art. The results is that, the thickness d between the bottom of the tapping screw holes 263 formed by tapping screws 458 and the lower portion of the thin portion 456 is larger than d', therefore the working gas does not flow through the thin portion 456 with thickness d of the casting to leak outside.

The terminal box 552 serving as a fitting is an example to explain the installation structure. Mainly speaking, the present invention has the feature that the working gas with small molecular weight such as helium or the like is sealed into the housing, and to prevent the working gas from leaking from the thin portion of the casting, and to keep the working gas in a specific pressure, the tapping screws are used to install suitable accessories on the thin portion of the housing 2.

Using the motor 6, the crank shaft 7 rotates forwardly, and the crank portions in the crank chamber rotate by a phase shift of 90-degree. The compression piston 21 and the expansion piston 27 reciprocate with 90-degree phase shift through the connecting rods 8, 9, which link to the crank portions 12, 13, cross guide heads 10, 11, and the compression piston rod and expansion piston rod.

While the expansion piston 25 slowly moves ahead by about 90 degrees in the vicinity of the upper-dead point, the compression piston 19 rapidly moves toward the upper-dead point in the vicinity of the middle to compress the working gas. The compressed working gas flows into the slender grooves 35 of the radiating heat exchanger 29 through the connecting hole 33 and the manifold 32. The working gas is cooled by a cooling heat, which is accumulated in the regenerator 30, and the working gas flows into the low-temperature chamber (expansion space) 26 through the slender grooves 45.

When the compression piston 19 slowly moves to the vicinity of the upper-dead point, the expansion piston rapidly moves toward the lower-dead point, and the working gas flowing into the low-temperature chamber 26 (expansion space) is rapidly expanded, thereby generating cooling heat. Thereby, the cold head 48 including the cooling heat exchanger is cooled to a low temperature.

The cooling heat exchanger 31 cools a cooling heat refrigerant of a cooling heat utilizing apparatus connected to the cooling fins 47. When the expansion piston 25 moves to the upper-dead point from the lower-dead point, the compression piston 19 moves toward the lower-dead point from the middle position, the working gas flows into the regenerator 30 from the low-temperature chamber 26 (expansion space) through the slender grooves 45, and the cooling heat of the working gas is accumulated in the regenerator 30. The cooling heat accumulated in the regenerator 30 is reused for cooling the working gas fed from the high-temperature chamber 20 through the radiating heat exchanger 29 as described above.

The cooling heat refrigerant, which is cooled in the cooling heat exchanger 31, is sent to various cooling heat utilizing apparatuses through flowing-out pipes 61 in order to perform cooling. For example, the cooling heat refrigerant is sent to cooling heat refrigerant pipes of cooling heat utilizing apparatuses such as a refrigerator to perform chilling or cooling inside the cooling heat utilizing apparatuses. Then the cooling heat refrigerant flows into the cooling heat exchanger 31 through flowing-in pipes 62 from the cooling heat utilizing apparatuses in order to circulate in the cooling heat utilizing apparatuses and to be cooled again.

The cooling water sent from the radiator flows from the flow-in port 42 into the radiating heat exchanger 29 and cools the working gas through the radiating passage 38. Further, the cooling water flows into the cooling water passage 40 and flows through a neighborhood of the compression and the expansion cylinders 17, 18. Thereby it cools the compression and expansion cylinders 17, 18 from the neighborhood thereof. After that, the cooling water flows out of the flow-out port 43, and is cooled by the cooling fins of the radiator, and then circulates towards the radiating heat exchanger 29.

The buffer tank 51 is formed in such a way that the pressure in the buffer space 48 and the housing 2 are equal. The buffer tank 51 absorbs the pressure fluctuation in the buffer space 48 and in the housing 2, and buffers the influence of pressure fluctuation that makes it not able to reach the buffer space.

FIG. 4D shows the installing structure of a conventional balancer 601 without a position determining pin. When the Stirling refrigerator 1 operates, it drives the crank shaft 7' to rotate, then the balancer 60 moves (rotates) with respect to screws 56. The installing position is therefore shift. This results in the balancer 60 moving from a suitable position of shock-resistance, and so it cannot achieve the effect for determining shock-resistance.

However, the installing structure of the balancer 52 according to the present invention is shown as FIGS. 4A, 4B. By inserting a position determining pin 59 into the small hole 55 on the shaft 7 and into the small hole 58 on the balancer 52, the moving of the balancer 52 with respect to the screw 56 can be prevented. Thereby, the effect of determining shock-resistance of the balancer 52 can be kept.

When the Stirling refrigerator 1 vibrates, the fixing nuts 64, 67 of the couplers 153, 160 are generally easily to be loosened. However, in the present invention, the shock-resistant fitments 65, 68 with door-shaped flanges are installed in such a way that they embay the couplers 153, 160 respectively from left, right, up and down and are in contact with the fixing nuts 64, 67 of the couplers, so the looseness of the fixing nuts 64, 67 can be prevented. The fixing nuts 64, 67 further function as dynamic dampers. This results in the couplers 153, 160 not becoming be loosened, and the leaking of working gas can be prevented.

The pressure sensor 159 of the present invention is installed by fixing the pressure sensor installing fitment 158 onto the installing block 156. During the maintenance, when adjusting pressure inside the crank chamber 5 with the sensor, it is needed to connect the working gas supply pipe 154 to the coupler 153 and inject the working gas from the working gas source, then insert an adjusting instrument such as a spanner or the like inside the slit of the C-shaped pressure sensor installing fitment 158 to adjust the pressure sensor 159.

The Stirling refrigerator 1 as shown in FIG. 8A reduces the repeating fatigue of the oil seal bellows, because it makes the reciprocations go to compression side stroke S and return to free length.

The regenerator 30 according to the present invention is shown in FIG. 9A. Filters 356, which are passable for the working gas and not passable for the cut pieces of the wire-netting material, are disposed on the upper and lower exit/entrance 354, 355. Working gas flowing outside from the regenerator 30 with the cut pieces of the wire-netting material is therefore prevented. Thereby, it prevents the cut pieces of the wire-netting material from flowing into high-temperature chamber 20, low-temperature chamber 26 and slender grooves 35, 45.

Because the thickness d between the bottom of the tapping screw holes 263, which are formed by tapping screws 458, and the bottom of the thin portion 456 is relatively large, the working gas won't flow through the portion of thickness d of the thin portion 456 and leak outside.

In the structure described above, the balancer installed on the crank shaft can not only be fixed onto the installing face formed on the crank shaft by screws, but also prevents the balancer from moving with respect to the crankshaft. The installing position won't be moved, thus the effect of shock-resistance won't decrease.

Due to the structure described above, even though heat engines such as the Stirling refrigerator operate under vibration, the effect of shock-resistance can be kept, and the looseness of fixing nuts (fixing screws) can be obstructed, therefore the working gas won't leak.

During maintenance, when adjusting pressure inside the crank chamber, it is needed to connect the working gas supply pipe to the coupler and inject the working gas from the working gas source, then insert an adjusting instrument such as a spanner or the like inside the slit of the C-shaped pressure sensor installing fitment to adjust the pressure sensor. Thus the pressure management of the working gas, which is important in a Stirling refrigerator, can be easily done.

In the structure described above, the oil seal bellows at the compression and expansion side reciprocate going toward the compression side and return to free length. Therefore the force damaging the oil seal bellows is decreased, the repeating fatigue is reduced, the oil rising of the Stirling refrigerator can be prevented, and a longer life time of the oil seal-bellows is achieved.

In the structure described above, filters are disposed on the regenerator, even though the wire-netting material is cut into pieces as time goes by, they cannot flow from the regenerator with the working gas. Therefore, the energy loss increasing, which is due to the flowing resistance increasing resulting from the jam of the radiating heat exchanger, and cooling heat exchanger caused by the cut pieces of the wire-netting material, can be prevented. The obstruction of smooth reciprocating between the compress cylinder and the expansion cylinder and pistons can be prevented. The troubles of cylinder damage can be prevented.

Due to the structure described above, even accessories are fixed by screws onto the thin portion of the housing made of cast that forms Stirling refrigerator, so the working gas can be prevented from leaking out of the screw holes through the thin portion. Therefore, the pressure of the working gas inside the housing becomes stable, the imperfect function or the damage of the rod seals such as oil seal bellows or the like can be reduced, so that the Stirling heat engine can operate stably and has a longer life time.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A Stirling refrigerator, comprising:
   a housing formed by casting, wherein a motor and a crank are disposed inside the housing, and a working gas is sealed inside the housing, a part of the housing has a thin portion, and a fitting is installed on the thin portion, and the fitting is fixed on the thin portion by a tapping screw;

a cylinder fixed on a top of the housing;

a piston, reciprocating inside the cylinder;

a piston rod moving with the crank, wherein one end of the piston rod links the piston and passes through the housing; and an oil seal bellows sealing a space between the housing and the cylinder, wherein a tip end of the oil seal bellows is sealed and fixed on the piston or the piston rod inside the cylinder, and a base end of the oil seal bellows is installed on the housing, and the oil seal bellows reciprocating with a stroke, wherein the tip end of the oil seal bellows is compressed to a compression side from a position of free length then returns to the position of free length.

2. The Stirling refrigerator according to claim 1, wherein the oil seal bellows is applied in the compression cylinder and in the expansion cylinder or one of them.

3. The Stirling refrigerator according to claim 1, wherein the fitting is a terminal box.

4. The Stirling refrigerator according to claim 1, wherein the working gas is helium, hydrogen or argon.

5. The Stirling refrigerator according to claim 1, further comprising an balancer installing structure, wherein the crank having a crank shaft driven by the motor, and the balancer installing structure is fixed on the crank shaft by a screw, and each surface of the crank shaft and the balancer, which contact with each other, has a small hole acentric from the screw, and a position determining pin is used to insert the small hole in order to prevent the balancer moving on an installing face of the crank shaft.

6. The Stirling refrigerator according to claim 5, wherein each amount of the small holes formed on each of the surfaces and the position determining pin is one or two or more.

7. The Stirling refrigerator according to claim 5, wherein the position determining pin is a split pin.

8. The Stirling refrigerator according to claim 1, further comprising a working gas injecting coupler installing structure in order to connect a working gas supply pipe coming from a working gas source and to inject the working gas into the Stirling refrigerator, and the working gas injecting coupler installing structure comprising:

a fixing screw, fixing and connecting the coupler and the working gas supply pipe;

a coupler installing fitment; and a coupler shock-resistant fitment fixed on the coupler installing fitment with the coupler.

9. The Stirling refrigerator according to claim 8, wherein the coupler shock-resistant fitment is fixed on the coupler installing fitment, and the coupler shock-resistant fitment contacts with the fixing screws in a way that the fixing screws won't be loosened.

10. The Stirling refrigerator according to claim 8, further comprising a crank chamber or a buffer chamber, wherein the coupler for injecting the working gas injects the working gas into the crank chamber or the buffer chamber.

11. The Stirling refrigerator according to claim 8, wherein the shock-resistant fitment has a door-shaped flange.

12. The Stirling refrigerator according to claim 10, wherein the shock-resistant fitment is a member with a door-shaped flange.

13. The Stirling refrigerator according to claim 8, wherein the shock-resistant fitment is a pair of members, wherein each of the member is L-shaped sectional.

14. The Stirling refrigerator according to claim 10, wherein the shock-resistant fitment is a pair of members, wherein each of the members is L-shaped sectional.

15. The Stirling refrigerator according to claim 1, further comprising a crank chamber, an installing block and a pressure sensor installing structure, wherein the installing block has a through hole connecting the crank chamber, and a pipe for supplying the working gas connects the through hole of the installing block, and a pressure sensor, which is pressure-adjustable, is installed on the installing block through fixing a pressure sensor installing fitment having a slit, and a pressure of the pressure sensor is adjusted by inserting an adjusting instrument from the slit.

16. The Stirling refrigerator according to claim 15, wherein the pressure sensor installing fitment is C-shaped planar.

17. The Stirling refrigerator according to claim 1, further comprising a high-temperature chamber and a radiating heat exchanger, a low-temperature chamber and a cooling heat exchanger, a working gas flow passage and a regenerator, wherein the working gas flow passage is between the high-temperature chamber and the low-temperature, and the regenerator is disposed between the radiating heat exchanger and the cooling heat exchanger, and an exit and an entrance of the working gas are formed respectively at two ends of the regenerator, and filters are respectively disposed on the exit and the entrance.

18. The Stirling refrigerator according to claim 17, wherein the regenerator is made of tiny wire-netting material.

19. The Stirling refrigerator according to claim 17, wherein the filters are made of porous sinter material or ceramic.

* * * * *